(12) United States Patent
Bettenhausen et al.

(10) Patent No.: US 8,430,108 B2
(45) Date of Patent: Apr. 30, 2013

(54) DEVICE FOR CLEANING A WINDOW OR LENS

(75) Inventors: Jens Bettenhausen, Ronshausen (DE); Patrick Opel, Rotenburg (DE); Dirk Ringler, Friedewald (DE); Heiko Weitzel, Schenklengsfeld-Hilmes (DE)

(73) Assignee: Continental Automotive GmbH, Hannover (DE)

( * ) Notice: Subject to any disclaimer, the term of this patent is extended or adjusted under 35 U.S.C. 154(b) by 633 days.

(21) Appl. No.: 12/527,934

(22) PCT Filed: Feb. 8, 2008

(86) PCT No.: PCT/EP2008/051567
§ 371 (c)(1),
(2), (4) Date: Feb. 25, 2010

(87) PCT Pub. No.: WO2008/104450
PCT Pub. Date: Sep. 4, 2008

(65) Prior Publication Data
US 2010/0163079 A1 Jul. 1, 2010

(30) Foreign Application Priority Data
Feb. 28, 2007 (DE) .......................... 10 2007 009 728

(51) Int. Cl.
*B08B 3/00* (2006.01)

(52) U.S. Cl.
USPC ............ 134/172; 134/123; 134/198; 15/97.1; 15/97.3; 239/284.1; 239/284.2

(58) Field of Classification Search .................. None
See application file for complete search history.

(56) References Cited

U.S. PATENT DOCUMENTS

| | | | |
|---|---|---|---|
| 6,354,515 B1 | 3/2002 | Matsumoto et al. | |
| 7,281,671 B2 | 10/2007 | Mota Lopez et al. | |
| 2006/0038037 A1 | 2/2006 | Mota Lopez et al. | |
| 2006/0226266 A1* | 10/2006 | Russell et al. ............. | 239/589.1 |
| 2006/0243823 A1 | 11/2006 | Bachmann et al. | |

FOREIGN PATENT DOCUMENTS

DE 39 35 318 A1 4/1991
(Continued)

OTHER PUBLICATIONS

German Office Action, German Application No. 10 2007 009 728.1, 3 pages, Jul. 26, 2007.
(Continued)

*Primary Examiner* — Eric Golightly
(74) *Attorney, Agent, or Firm* — King & Spalding L.L.P.

(57) ABSTRACT

In a device (1) for cleaning a window (2) or a lens of a motor vehicle, a wash nozzle (5) is of spherical design and is held in a ball socket (13) of a nozzle stem (4). The wash nozzle (5) produces a fan-type jet (6) and can be adjusted by an angle of inclination α and a tilting angle β in relation to the nozzle stem (4). The device can be freely adjusted to different designs of the motor vehicle.

10 Claims, 4 Drawing Sheets

FOREIGN PATENT DOCUMENTS

| | | |
|---|---|---|
| DE | 197 53 780 A1 | 6/1999 |
| DE | 100 30 662 A1 | 1/2001 |
| DE | 103 39 505 A1 | 3/2005 |
| JP | 11 034812 | 2/1999 |
| JP | 2006205979 A1 | 8/2006 |
| WO | WO 02/060589 | 8/2002 |
| WO | WO 2004/056627 A1 | 7/2004 |
| WO | WO 2005/021341 A | 3/2005 |
| WO | WO 2007/019919 | 2/2007 |

OTHER PUBLICATIONS

International PCT Search Report, PCT/EP2008/051567, 6 pages, Mailed Jun. 2, 2008.

* cited by examiner

DEVICE FOR CLEANING A WINDOW OR LENS

CROSS-REFERENCE TO RELATED APPLICATIONS

This application is a U.S. National Stage Application of International Application No. PCT/EP2008/051567 filed Feb. 8, 2008, which designates the United States of America, and claims priority to German Application No. 10 2007 009 728.1 filed Feb. 28, 2007, the contents of which are hereby incorporated by reference in their entirety.

TECHNICAL FIELD

The invention relates to a device for cleaning a window or a lens of a motor vehicle with a wash nozzle which is held by a nozzle stem and generates a fan-type jet and with means for adjusting the angle of inclination of the wash nozzle in relation to the window, the wash nozzle being adjustable in its inclination in relation to the nozzle stem.

BACKGROUND

Devices of this type are frequently used in current-day motor vehicles and are known from practical experience in various embodiments. In one embodiment known from practical experience, the wash nozzle is cylindrical in its configuration and may be twisted in the nozzle stem. For this purpose, a slotted recess is arranged at one of the end faces of the wash nozzle. An outlet opening of the wash nozzle is arranged on the casing of the wash nozzle. However, this leads to a large number of sealing surfaces. Furthermore, the wash nozzle is adjustable exclusively in its inclination. Adjustment of the wash nozzle in a tilting angle arranged transversely to the angle of inclination would require the entire nozzle stem to be adjusted. However, in current-day motor vehicles, adjusting the tilting angle is also desirable, as, for example in head lamps, the wash nozzle cannot always be arranged centrally before the lens. Furthermore, the lenses of head lamps are frequently inclined or adjoining components for mounting the nozzle stem are arranged at an inclination relative to the lenses.

Furthermore, devices have become known in which the entire nozzle stem is adjustable in relation to a body sheet. However, this requires high design costs. Furthermore, forces are introduced into the nozzle stem as a result of movements of a washing liquid line connected to the nozzle stem. This can lead to adjustment of the orientation of the wash nozzle.

Furthermore, it is known to arrange a nozzle in a receptacle and to connect the receptacle to adjoining components of the device via a ball joint. However, this leads to a large number of sealing surfaces. Furthermore, it is possible to adjust the wash nozzle only very imprecisely, as the receptacle and the ball joint are resilient and therefore restoring forces act on the wash nozzle after the adjustment. In addition, this configuration requires a particularly large amount of overall space.

Furthermore, spherical wash nozzles have become known from practical experience. However, spherical wash nozzles of this type generate spot-type jets. In order to restrict a spray region, use is therefore generally made of a plurality of spherical wash nozzles which are arranged next to one another and each spray a small partial region of the spray region provided. However, this leads to a marked increase in costs when adjusting the spray region as a whole.

SUMMARY

According to various embodiments, a device of the type mentioned at the outset can be developed in such a way that it allows especially free adjustment of the spray region on the window and is constructed in as simple a manner as possible.

According to an embodiment, a device for cleaning a window or a lens of a motor vehicle may comprise a wash nozzle which is held by a nozzle stem and generates a fan-type jet and with means for adjusting the angle of inclination of the wash nozzle in relation to the window, the wash nozzle being adjustable in its inclination in relation to the nozzle stem, characterized in that means are provided for adjusting the tilting angle $\beta$, pointing transversely to the angle of inclination $\alpha$, of the fan-shaped jet generated by the wash nozzle and in that the wash nozzle is adjustable for adjusting the tilting angle $\beta$ in relation to the nozzle stem.

According to a further embodiment, the wash nozzle may have a spherical shape and the nozzle stem may comprise a ball socket for receiving the wash nozzle. According to a further embodiment, recesses for attaching an adjustment tool for adjusting the angle of inclination $\alpha$ and the tilting angle $\beta$ may be grouped around an outlet opening of the wash nozzle. According to a further embodiment, the wash nozzle may have a flattening and the recesses for attaching an adjustment tool and the outlet opening can be arranged on the flattening. According to a further embodiment, the wash nozzle may have an inlet opening and the inlet opening may comprise a grate. According to a further embodiment, the inlet opening can be arranged in a flattening. According to a further embodiment, the wash nozzle may comprise two shell parts, wherein inserts for generating the fan-type jet are arranged in one of the shell parts and the other shell part seals the inserts and wherein the shell part may comprising the inserts may be larger than the shell part sealing the inserts. According to a further embodiment, the wash nozzle can be held in the nozzle stem in a force-transmitting manner and the shell parts may be pre-tensioned in relation to each other by the nozzle stem. According to a further embodiment, the shell parts can be joined together at the side of the outlet opening via a film hinge which is produced in one piece with the shell parts. According to a further embodiment, a respective film hinge may be arranged on both sides of the outlet opening.

BRIEF DESCRIPTION OF THE DRAWINGS

The invention permits numerous embodiments. In order further to illustrate the basic principle of the invention, one such embodiment will be described hereinafter and is illustrated in the drawings, in which.

DETAILED DESCRIPTION

Figure 1:
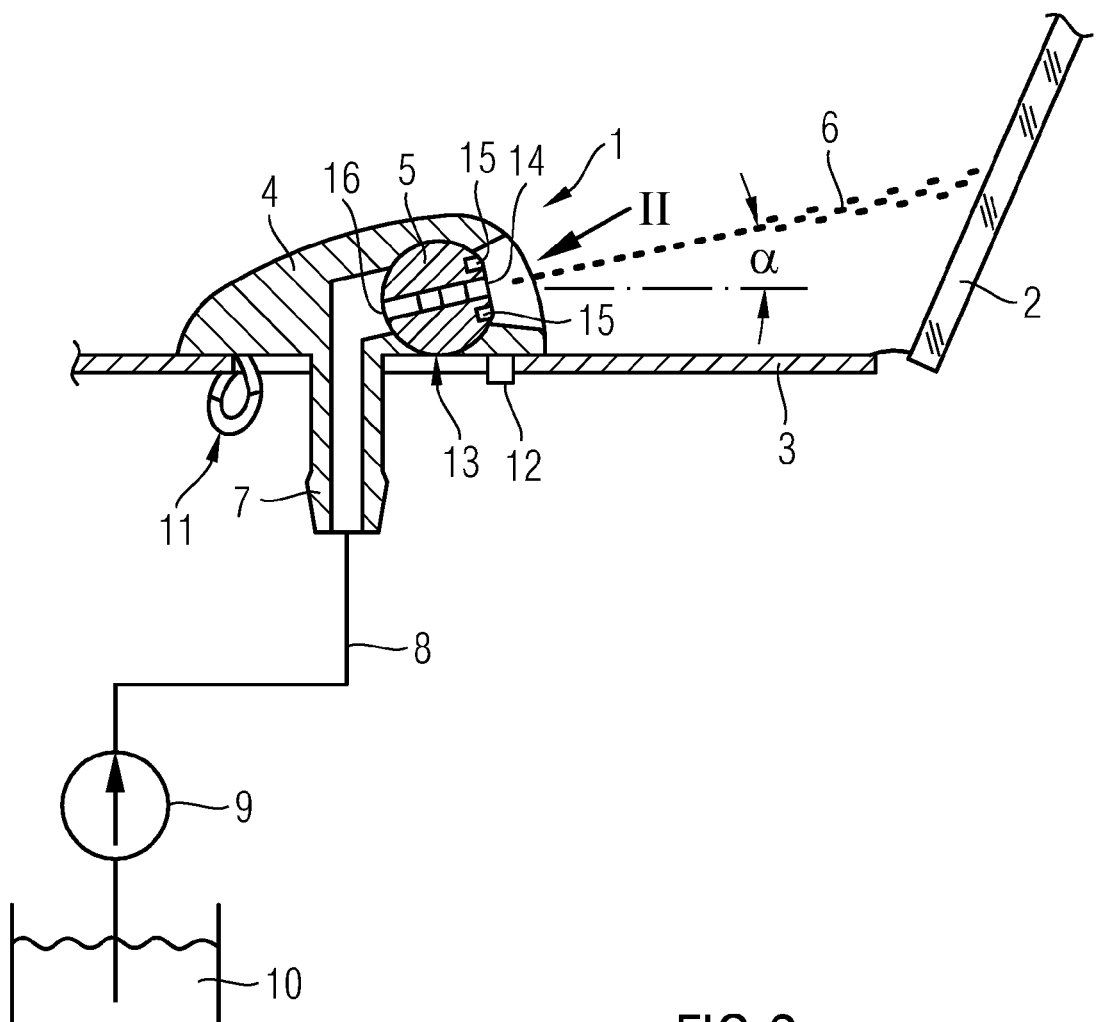
FIG. 1 is a partial section through a device according to an embodiment with adjoining components of a motor vehicle.

According to various embodiments, means are provided for adjusting the tilting angle, pointing transversely to the angle of inclination, of the fan-type jet generated by the wash nozzle and the wash nozzle is adjustable for adjusting the tilting angle in relation to the nozzle stem.

As a result of this configuration, the device has two degrees of freedom, that is to say, with respect to the angle of inclination and the tilting angle, about which the wash nozzle can be adjusted. Therefore, the various embodiments allow the spray region provided to be easily adjusted on the window. The various embodiments therefore allow the spray region to be reliably defined on the lens even in the case of inclined lenses and components, arranged at an inclination relative to the lenses, for mounting the nozzle stem. As the spray region is adjusted directly on the wash nozzle, restoring forces are kept particularly low. Furthermore, the device according to various embodiments requires only very few components, which are moreover simple to seal, and is therefore particularly simple in its construction. For generating the fan-type jet, the wash nozzle is embodied preferably as a fluidic nozzle.

The device according to various embodiments is particularly simple in its design if the wash nozzle has a spherical shape and if the nozzle stem comprises a ball socket for receiving the wash nozzle. According to various embodiments, the wash nozzle and nozzle stem have only a single sealing surface at the two adjustable degrees of freedom.

The tilting angle and the angle of inclination of the wash nozzle can, in the mounted state, easily be adjusted in one operation if recesses for attaching an adjustment tool for adjusting the angle of inclination and the tilting angle are grouped around an outlet opening of the wash nozzle. Furthermore, this allows the sealing area between the wash nozzle and nozzle stem to be kept particularly small; this helps to reduce an undesirable escape of washing liquid. In particular in comparison to a lateral arrangement of recesses in a cylindrical wash nozzle, the various embodiments also allow the number of sealing surfaces between the wash nozzle and nozzle stem to be kept particularly low.

According to further embodiments, the wash nozzle is easy to grip and to mount if the wash nozzle has a flattening and if the recesses for attaching an adjustment tool and the outlet opening are arranged on the flattening.

According to further embodiments, it helps to render the flow in the wash nozzle uniform if the wash nozzle has an inlet opening and if the inlet opening comprises a grate.

According to further embodiments, the dependency of turbulence of a flow in the nozzle stem on the angle of inclination or tilting angle may be kept particularly low if the inlet opening is arranged in a flattening.

According to further embodiments, the wash nozzle is produced in a particularly simple manner if the wash nozzle comprises two shell parts, if inserts for generating the fan-type jet are arranged in one of the shell parts and the other shell part seals the inserts and if the shell part comprising the inserts is larger than the shell part sealing the inserts. Furthermore, this also allows the outlet opening to be arranged centrally in the spherical shape of the wash nozzle.

It helps to simplify the mounting of the device according to various embodiments if the wash nozzle is held in the nozzle stem in a force-transmitting manner and the shell parts are pre-tensioned in relation to each other by the nozzle stem.

According to further embodiments, it helps further to simplify the production of the wash nozzle if the shell parts are joined together at the side of the outlet opening via a film hinge which is produced in one piece with the shell parts. The arrangement of the film hinge at the side of the outlet opening ensures that the shell parts are reliably oriented relative to and thus sealed from each other at this side. As this side determines the fan-type jet generated, this ensures high quality of the jet characteristic. Preferably, the wash nozzle is made from plastics material by injection-molding.

According to further embodiments, it is possible substantially to avoid adjustment of the shell parts relative to each other in the event of adjustment of the wash nozzle in relation to the nozzle stem if a respective film hinge is arranged on both sides of the outlet opening. As a result of this configuration, the shell parts are held relative to each other by the two film hinges in an intended position. The attaching of the adjustment tool therefore does not lead to adjustment of the shell parts relative to each other. In the most advantageous case, this may eliminate the need for further centering means for the shell parts.

FIG. 1 shows a device 1 for cleaning a window 2 of a motor vehicle with a nozzle stem 4 fastened in a body part 3 before the window 2. A wash nozzle 5, which sprays a fan-type jet 6 of washing liquid onto the window 2, is arranged in the nozzle stem 4. The nozzle stem 4 has a connection piece 7 to which a washing liquid line 8 is connected. A washing liquid pump 9 conveys washing liquid from a storage container 10 via the washing liquid line 8 to the nozzle stem 4 and thus to the wash nozzle 5. The fastening of the nozzle stem 4 in the body part 3 comprises locking hooks 11 and positioning elements 12. The wash nozzle 5 has a spherical shape and the nozzle stem 4 a ball socket 13 for receiving the wash nozzle 5. The nozzle stem 4 mounts the wash nozzle 5 in a force-transmitting manner. The fan-type jet 6 generated by the wash nozzle 5 generates on the window 2 a strip-shaped spray pattern having an elongation extending perpendicularly to the drawing plane.

The fan-type jet 6 of washing liquid sprayed by the wash nozzle onto the window 2 is inclined through the angle of inclination α. The angle of inclination α may be adjusted by twisting the wash nozzle 5 in the ball socket 13 of the nozzle stem 4. For attaching an adjustment tool (not shown), the wash nozzle 5 has recesses 15 arranged around an outlet opening 14 of the wash nozzle 5. An inlet opening 16 of the wash nozzle 5 is arranged within the nozzle stem 4.

Figure 2:
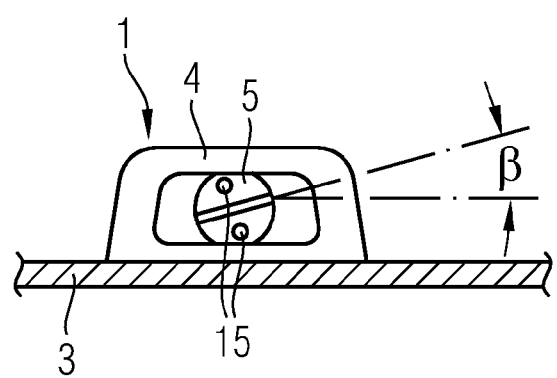
FIG. 2 is a view onto the device according to an embodiment from FIG. 1, viewed from position II.

FIG. 2 is a view onto the device 1 from FIG. 1, viewed from position II. It may be seen in this case that a tilting angle β, in which the fan-type jet 6 of washing liquid is sprayed onto the window 2 from FIG. 1, is also adjustable. The tilting angle β is adjusted in the same operation and using the same adjustment tool as the above-described adjustment of the angle of inclination α.

Figure 3:
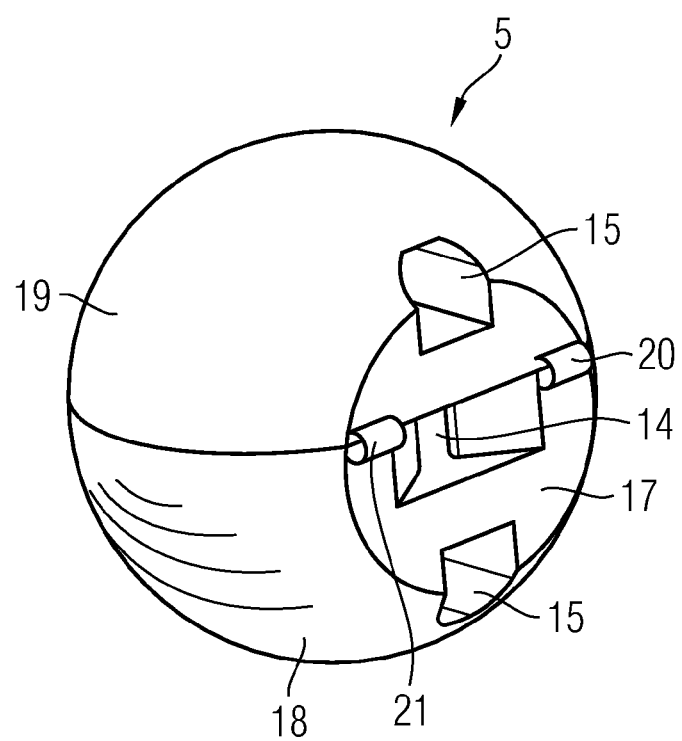
FIG. 3 is a greatly enlarged perspective view of a wash nozzle of the device according to an embodiment from FIG. 1.

FIG. 3 shows the wash nozzle 5 from FIGS. 1 and 2 in a greatly enlarged perspective view onto the outlet opening 14. The wash nozzle 5 has a flattening 17 in the region of the outlet openings 14 and the recesses 15 for the adjustment tool. Furthermore, the wash nozzle 5 has two shell parts 18, 19 which are pivotable in relation to each other about film hinges 20, 21. The film hinges 20, 21 are arranged on both sides of the outlet openings 14.

Figure 4:
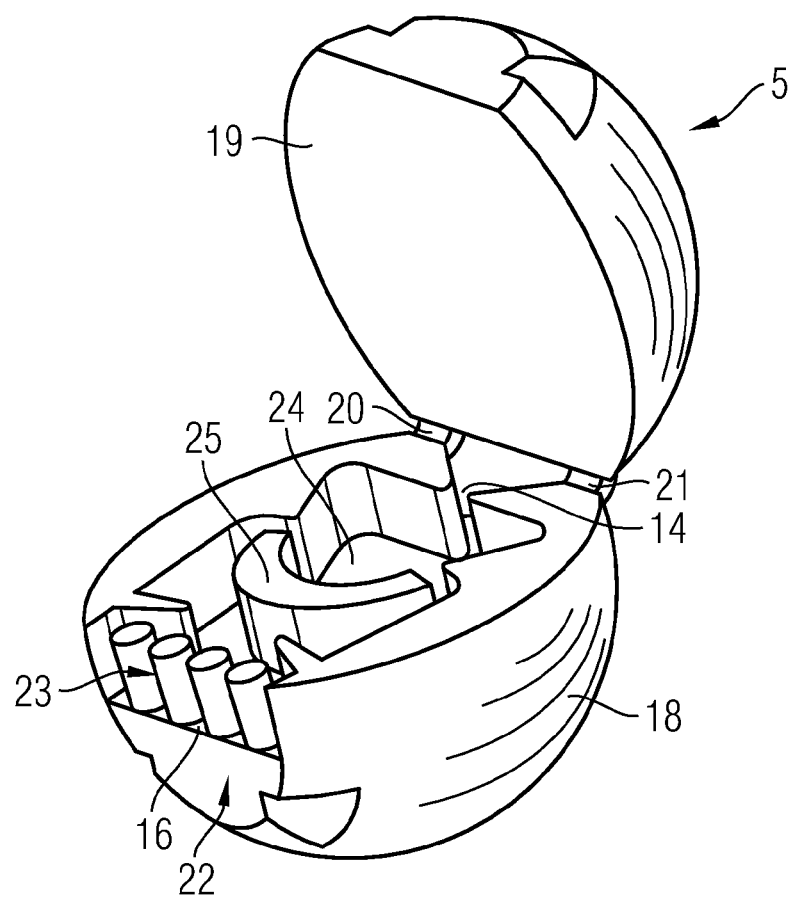
FIG. 4 shows the wash nozzle from FIG. 3 in the folded-open state.
Figure 5:
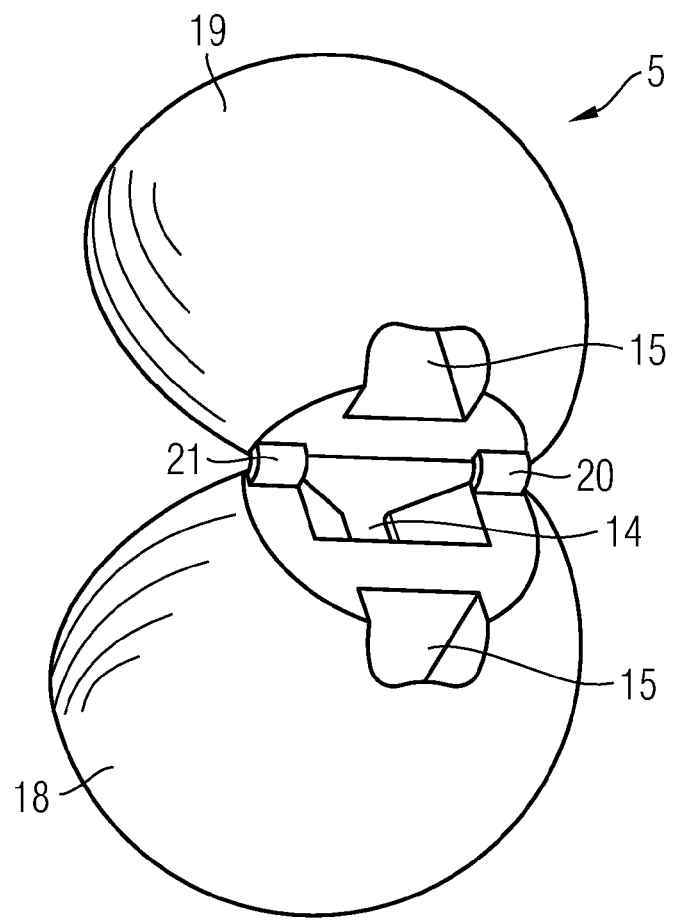
FIG. 5 is a further perspective view of the wash nozzle in the folded-open state.

FIG. 4 shows the wash nozzle 5 from FIG. 3 in the folded-open state from the side of the inlet opening 16. It may be seen in this case that the wash nozzle 5 also has a flattening and a grate 23 in the region of the inlet opening 16. Furthermore, a channel 24, which is guided from the inlet opening 16 up to the outlet opening 14, and inserts 25 for generating the fan-type jet 6 are arranged in one of the shell parts 18. The other shell part 19 seals the inserts 25 and the lateral boundaries of the channel 24. The shell part 18 comprising the inserts 25 is larger than the shell part 19 sealing the inserts 25 so that, as shown in FIG. 3, the outlet opening 14 is arranged centrally in the spherical shape of the wash nozzle 5. For the sake of clarity, FIG. 5 shows the wash nozzle 5 in the folded-open state from the side of the outlet opening 14.

What is claimed is:
1. A device for cleaning a window or a lens of a motor vehicle comprising:
 a wash nozzle which is held by a nozzle stem and generates a fan-type jet, the wash nozzle having an inlet opening formed in a first side of the wash nozzle and an outlet opening formed in an opposite second side of the wash nozzle and configured to output the fan-type jet, wherein the wash nozzle comprises two shell parts pivotally connected to each other by at least one film hinge arranged at the second side of the wash nozzle at which the outlet opening is located, and wherein each of the shell parts has a flattened portion at the second side of the wash nozzle, the flattened portions together defining a flattening at the second side of the wash nozzle when the shell parts are arranged in a closed position, means for adjusting an angle of inclination of the wash nozzle in relation to the window, wherein the wash nozzle is adjustable in its inclination in relation to the nozzle stem, and means for adjusting a tilting angle, pointing transversely to the angle of inclination, of the fan-shaped jet generated by the wash nozzle, wherein the wash nozzle is adjustable for adjusting the tilting angle in relation to the nozzle stem.

2. The device according to claim 1, wherein the wash nozzle has a spherical shape and the nozzle stem comprises a ball socket for receiving the wash nozzle.

3. The device according to claim 1, wherein recesses for attaching an adjustment tool for adjusting the angle of inclination and the tilting angle are grouped around an outlet opening of the wash nozzle.

4. The device according to claim 3, wherein the wash nozzle has a flattening and the recesses for attaching an adjustment tool and the outlet opening are arranged on the flattening.

5. The device according to claim 1, wherein the wash nozzle has an inlet opening and the inlet opening comprises a grate.

6. The device according to claim 5, wherein the inlet opening is arranged in a flattening.

7. The device according to claim 1, wherein inserts for generating the fan-type jet and an outlet opening of the wash nozzle are arranged in one of the shell parts and wherein the shell part comprising the inserts and the outlet opening is larger than the other shell part and shaped such that the outlet opening is centered, with respect to a radius extending from a central point, in both the angle of inclination and the tilting angle transverse to the angle of inclination.

8. The device according to claim 7, wherein the wash nozzle is held in the nozzle stem in a force-transmitting manner and the shell parts are pre-tensioned in relation to each other by the nozzle stem.

9. The device according to claim 1, wherein a respective film hinge is arranged on both sides of the outlet opening.

10. The device according to claim 1, wherein:
the wash nozzle includes a fluid channel and one or more inserts, and
the inlet opening, the outlet opening, the fluid channel, and the one or more inserts are formed completely in one of the shell parts, such that the other shell part is free of such features.

* * * * *